United States Patent [19]

Stroud, deceased et al.

[11] 3,965,781

[45] June 29, 1976

[54] BANDSAW BOOK TRIMMER

[75] Inventors: William Felix Stroud, deceased, late of McKellar, Canada, by Lois Evelyn Stroud, executrix; Edward John Stroud, McKellar, Canada

[73] Assignee: Stroud Graphic Equipment Limited, McKellar, Canada

[22] Filed: Mar. 31, 1975

[21] Appl. No.: 563,425

Related U.S. Application Data

[63] Continuation-in-part of Ser. No. 318,617, Dec. 26, 1972, Pat. No. 3,888,150.

[30] Foreign Application Priority Data

Jan. 1, 1972 United Kingdom............................ 15
Apr. 9, 1974 United Kingdom............... 15627/74

[52] U.S. Cl.................................. 83/13; 83/661; 83/820; 83/835; 83/854; 83/925 A
[51] Int. Cl.²............................................. B26D 1/52
[58] Field of Search ............... 83/13, 4, 925 A, 806, 83/808, 820, 661, 854, 835, 174

[56] References Cited
UNITED STATES PATENTS

| | | | |
|---|---|---|---|
| 1,248,253 | 11/1917 | Bredenberg........................... | 83/174 |
| 2,827,091 | 3/1958 | Metz...................................... | 83/661 |
| 2,852,052 | 9/1958 | Hansen.................................. | 83/661 |
| 3,889,564 | 6/1975 | Aspinwall et al...................... | 83/174 |

*Primary Examiner*—Frank T. Yost
*Attorney, Agent, or Firm*—James T. Wilbur; Frank I. Piper; Arne I. Fors

[57] ABSTRACT

The invention relates to a method of trimming selvage from a succession of books. According to the method, a saw is provided having a pair of oppositely facing surfaces which merge at a cutting edge. One of the surfaces is substantially flat throughout its length or throughout all but the area of the surface adjacent the cutting edge. The latter area is bevelled as is the other surface of the saw. The books are advanced toward the saw and the saw is so positioned relative to the books such that its cutting run is normal to the direction of book advance and is parallel to the plane of the pages of the books. The saw is also positioned such that its first-mentioned surface faces pages trimmed by the saw and its other surface faces selvage trimmed by the saw.

9 Claims, 9 Drawing Figures

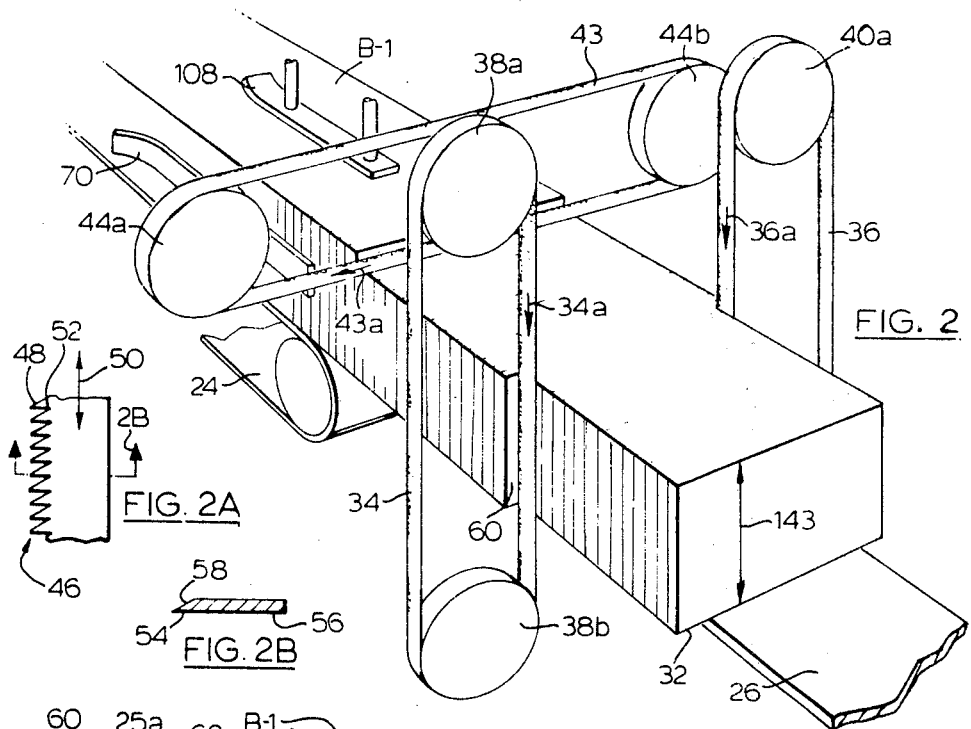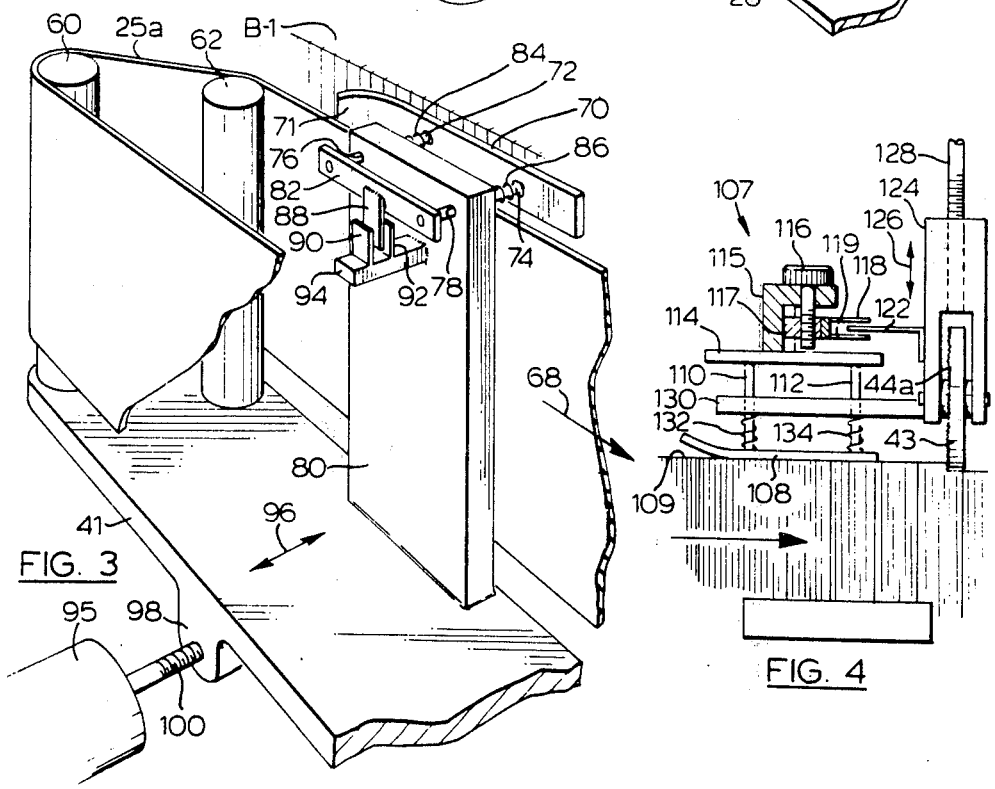

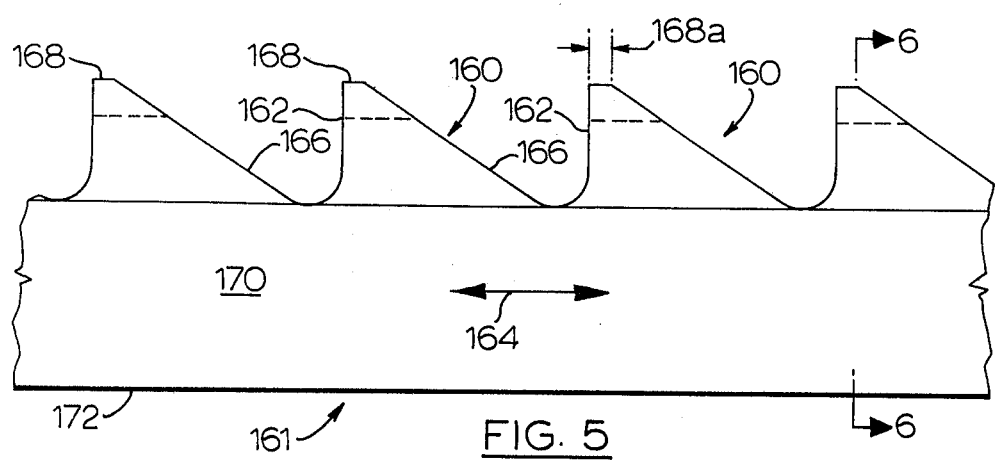
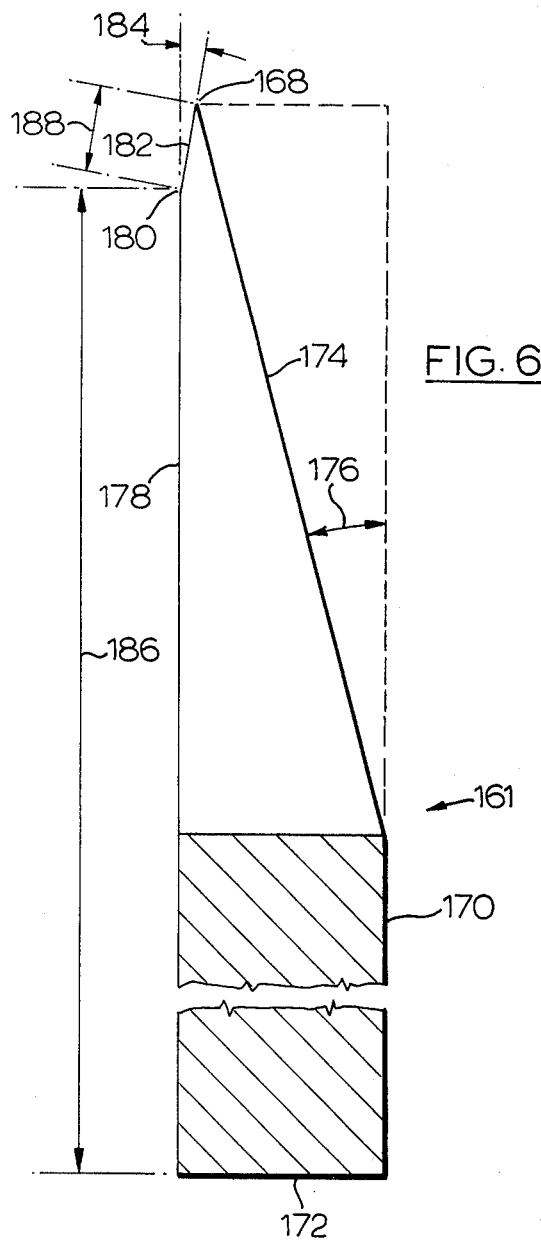
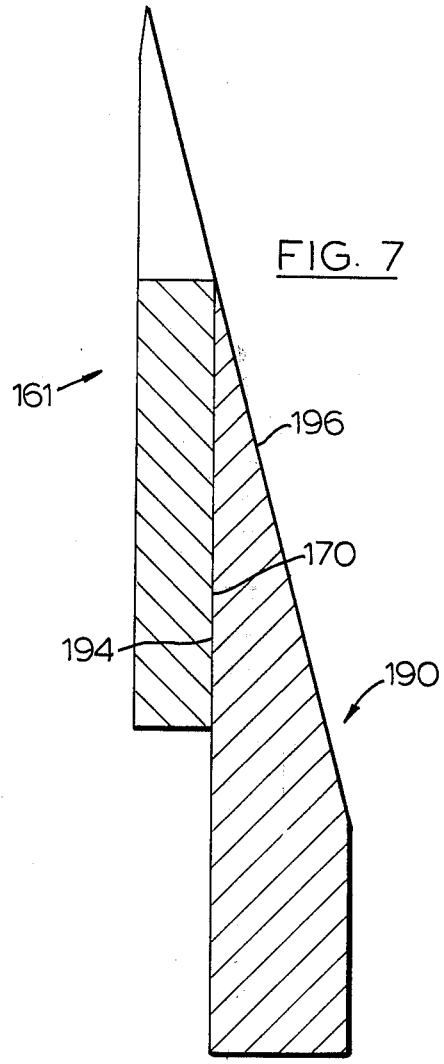

BANDSAW BOOK TRIMMER

This is a continuation-in-part of our parent application Ser. No. 318,617 filed on Dec. 26, 1972, now U.S. Pat. No. 3,888,150.

This invention relates to a method of conducting one of a series of operations in an integrated book bindery system and more particularly to a method of trimming selvage from books to render the books suitable for rounding and backing and for applying hard covers to bound pages.

Known book bindery systems comprise a number of different machines for carrying out the various steps of the binding operation. The system may include a hot melt binding machine, a trimmer, a rounding and backing apparatus and a machine for applying hard covers to bound pages (a "casing-in" machine). Generally, such machines function entirely independent of one another and when operating are designed to handle one specific size and kind of book, whether paperback or hard cover. Each machine must be set up for the specific size of book passing through the system and if a different size of book is to be produced, then the system must be shut down to permit appropriate adjustments to be made to each individual machine.

It would, of course, be desirable to bring all of the machines together so as to provide an automated binding system where loose sheets or signatures of the book could be collated and fed in at one end of the system and wherein the finished cased-in book could emerge at the other end. However, if the various known machines are put together in succession, the system would still suffer from the disadvantage mentioned above, namely that the whole system when operating would handle only one size and kind of book and the system would have to be shut down to permit adjustment of each individual machine of the system to accommodate differing kinds and sizes of books to be produced therefrom.

It is an object of the present invention to provide an improvement to a method of operation of one of the components of the integrated book bindery system described in the said parent application Ser. No. 318,617.

It is another object of the invention to provide a method of trimming pages of either paperback or hard cover books from collated sheets or signatures. A feature of the method is that different sizes of collated sheets can be accommodated to produce different sizes of books without the necessity of interrupting the operation and making adjustments before the operation can continue.

A further object of the invention is to provide a method of operation of a book trimmer which method may be carried out independently or may be incorporated into an integrated bindery system including a book trimmer, a rounding and backing apparatus and a casing-in apparatus.

These and other objects are accomplished by a method of trimming selvage from a plurality of books including the following steps: providing a saw having a pair of oppositely facing surfaces which merge at a cutting edge, one said surface having first and second portions, said first portion extending from a base of said saw to said second portion and being disposed substantially in a plane parallel to the cutting run of said saw and said second portion extending from said first portion to said cutting edge, the other said surface being oriented at an oblique angle to said cutting run plane; causing said books to advance downstream to said saw; positioning said saw relative to said books such that the cutting run of said saw is both normal to the direction of advance of said books and is substantially parallel to the plane of the pages of said books and such that said one surface faces pages to be trimmed by said saw and the other said surface faces selvage to be trimmed by said saw; and trimming said books by means of said saw.

The invention is explained with reference to the accompanying drawings in which:

FIG. 2 is a perspective view of the trimming saws in the trimmer section of the machine;

FIG. 2A is an elevation of a portion of the band saws illustrated in FIG. 2;

FIG. 2B is a section on line 2B - 2B of FIG. 2A;

FIG. 3 is a detailed perspective view of automatic lateral adjustment means for one of the trimmer saws;

FIG. 4 is an elevation, partly in section showing the automatic vertical adjustment mechanism for one of the trim saws;

FIG. 5 is an elevation of a portion of a second embodiment of a saw blade which may be incorporated into the trimmer section;

FIG. 6 is a section on line 6—6 of FIG. 5; and

FIG. 7 is another section of the saw blade of FIG. 5 shown in conjunction with a blade guide.

Like reference characters refer to like parts throughout the description of the drawings.

THE INTEGRATED BINDERY SYSTEM

Figure 1:
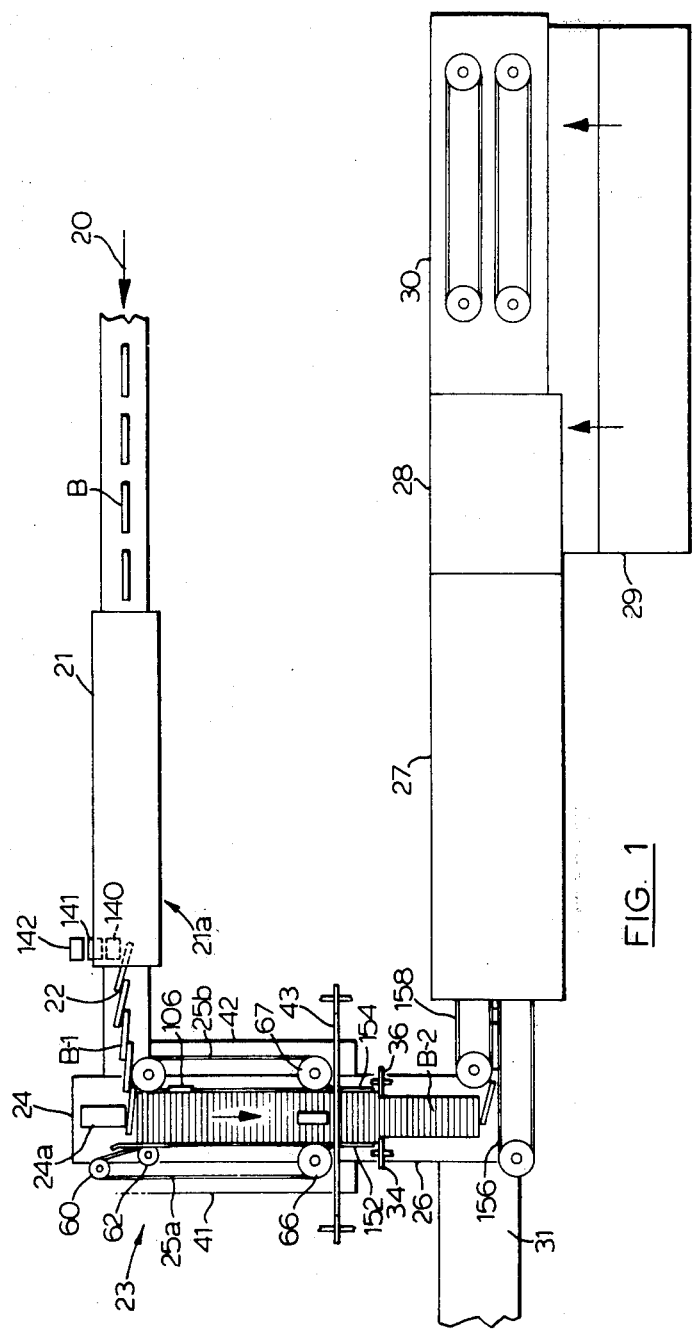
FIG. 1 is a layout of the integrated book bindery system, partly diagrammatic and partly in simplified plan.

The book trimmer operated according to the method of the invention may be incorporated into the integrated bindery system illustrated in FIG. 1. The bindery system is designed to accept books which have been printed and collated and perform all the bindery operations needed to make a finished book. By way of clarification, it should be noted at this point that the term "book" is utilized throughout the specification to refer to the article in all its stages through the bindery system from the collated books aforesaid to the finished cased-in books with hard covers.

The integrated bindery machine, illustrated in FIG. 1, utilizes a sequential arrangement of hot melt binder, trimmer, rounder and backer and casing-in and building-in apparatus, all arranged to function automatically and to be self-adjusting whereby various types and sizes of collated books may be fed initially into the hot melt binder without having to close the whole integrated machine down for the adjustment of the other elements of the machine. In the machine described herein, the hot melt binder is of conventional construction. The trimmer is of novel construction and its operation forms the subject matter of this application. The rounder and backer and the casing-in and building-in apparatus is described in detail in our parent application referred to above.

Referring now to FIG. 1 of the drawings, the printed and collated books B enter the machine at 20 and pass into a hot melt binder 21 which, as mentioned hereinbefore, is of conventional form in the subject machine. In the hot melt binder 21, the spine of the books B may be ground in the usual manner and, at this stage, if the books are to be paperbacks and not cased-in hard cover books, the cover is applied thereto at 21a. If the books are to be cased-in, a stretch cloth may be applied instead of the cover or, alternatively, wrap-around end papers consisting of a single sheet or two folded sheets joined with stretch cloth may be applied.

The books now designated B-1 leave the hot melt binder 21 in a lapped formation, as shown by reference numeral 22 and are then fed to the trimming apparatus generally 23 on conveyor belt 24. Horizontally travelling conveyor belts 25a and 25b carry the books along in stacked formation to bandsaw 43 in the trimmer section of the bindery machine. A back-up block 24a may be required to force a given number of books into contact with the band saws. The band saws trim the books on the top side while the glued spine rests on the conveyor belt 24. The books then pass onto a table 26 and to band saws 34, 36 where the two side edges of each book are trimmed.

After this trimming stage, the books, now identified as B-2, pass over a heated portion of table 26 which preheats the spine to soften the hot melt adhesive preparatory to the book B-2 entering the rounding and backing apparatus 27. As shown in FIG. 1, the books B-2 are unstacked from the trimmer section by conveyor belts 156 and 158 and conveyed serially through the rounding and backing apparatus 27; the final operation of which may be made to include the application of head and tail bands as at 28. The final stage in this system comprises a cover feed 29 and a casing-in and building-in apparatus designated 30, from whence the completed book is delivered ready for packing in appropriate cartons or like means. It should also be noted that in FIG. 1 the system may be utilized for the hot melt binding and trimming of paperback books which do not of course pass through a rounding and backing apparatus 27 or a casing-in and building-in apparatus 30, an alternative take-off conveyor 31 being provided downstream of the trimmer section 23 for taking off such trimmed paperback books.

THE SELF-ADJUSTING BOOK TRIMMER

The trimmer illustrated in FIGS. 2 to 4 is a continuous flow non-indexing machine for trimming books. The machine is capable of adjusting itself to whatever size book is fed into it and need not be shut down when books of one size are changed for books of another.

With reference to FIG. 2, books B-1 are shown in a stacked formation with their glued spines 32 resting at the upstream side on the horizontally travelling conveyor belt 24 and on the downstream side on table 26. A pair of spaced apart vertically cutting band saws 34, 36 serve to trim the two side edges of the books. Band saw 34 is trained about upper and lower rollers 38a, b respectively, while band saw 36 is trained about upper roller 40a and a lower roller, not illustrated. Rollers 38a, b are positioned rotatably on a housing (not illustrated) which is mounted upon movable trimming station or bed 41 (FIGS. 1 and 3) while rollers 40a are also positioned on a housing and mounted to an immovable trimming station or bed 42 (FIG. 1). A horizontally cutting band saw 43 serves to trim the upper edge of the books and the saw is trained about spaced rollers 44a, b rotatably mounted to a movable trimming station or housing (described below) and driven by conventional means, not illustrated. It will be noted that the directions of the cutting runs of the band saws 34, 36, 43, where they contact the pages, indicated by arrows 34a, 36a and 43a, are parallel to the planes of the pages and normal to their direction of advance through the trimmer.

The cutting edges of the band saws, illustrated in FIG. 2A and indicated generally 46 are defined by a plurality of teeth each composed of a leading edge 48 which is oriented at an oblique angle to the direction of travel of the blade, indicated by double headed arrow 50, and a trailing edge 52 which is oriented generally horizontally to the direction of travel. With reference to FIG. 2B, the face of each tooth which contacts the edges of the trimmed pages, indicated 54 has no "set", i.e. the edge is coplanar with the remainder of the non-cutting surface of the blade in contact with the trimmed pages indicated 56. The oppositely facing surface 58 of each tooth which contacts the trimmed material or selvage 60 (FIG. 2) from each page is beveled and meets face 54 at a sharp edge.

The tooth construction of the band saws 34, 36, 43 permits smooth trimming of any desired width of selvage 60 from the pages constituting books B-1. The selvage material may be carried away by appropriate vacuum means such as a suction hood (not illustrated).

FIG. 3 illustrates the upstream end of book advance belt 25a (also shown in FIG. 1) which presses laterally against the side edges of books B-1 to advance them to the book trimming band saws illustrated in FIG. 2. Belt 25a is trained about vertically disposed rollers 60, 62 journalled in bearings in bed 41 and a similarly mounted roller 66 (FIG. 1) at the downstream end maintains the belt taut and in contact with the page edges. Any one of the rollers is connected to a conventional prime mover (not illustrated) to drive the belt horizontally in the direction of arrow 68.

The side edges of the books are also contacted by a sensor 70 in the form of an elongated rectangular strip bent outward of the direction of book advance at its upstream end at 71 to prevent its jamming the books as they travel thereby. A pair of spaced parallel rods 72, 74 extend normally from the face of the sensor not in contact with the book side edges and the rods are slideably received in a pair of spaced apertures 76, 78 formed in a rigid support post 80 carried by bed 41. A plate 82 interconnects the ends of rods 72, 74 opposite sensor 70. Suitable resilient means such as coil compression springs 84, 86 bias the sensor into contact with the side edges of the books at all times.

Plate 82 carries a central electrically insulated terminal 88 of a micro-switch assembly further constituted by opposed electrically insulated terminals 90, 92 which extend upwardly from base 94 mounted to support post 80. The micro-switch is in circuit with an electric motor 95.

Bed 41 is mounted in tracks or other suitable means (not illustrated) for slideable horizontal movement in a direction normal to the direction of travel of the books. The direction of movement of bed 41 is indicated by arrow 96. The bed is provided with a block 98 having a threaded opening for receipt of a threaded worm shaft 100 driven by motor 95. Rotation of the shaft will cause the bed to move either toward or away from the books depending on whether the shaft rotates clockwise or counter-clockwise.

Sensor 70 together with the aforementioned parts operatively connected thereto serve to positon band saw 34 correctly to remove the same width of selvage from the side of books B-1 whatever size the books may be within a given range of sizes. Such positioning is accomplished continuously; there is no necessity to halt the passage of books for an extended period in order to permit repositioning of the band saw where the size of books passing by the saw changes. The means by which repositioning of the band saw takes place is as follows: When the size of pages of books passing by sensor 70 increases, the pages will press laterally against the sensor causing it to move outwardly i.e. toward support post 80. Outward movement of the sensor will thus cause central terminal 88 to complete an electrical circuit through terminal 90 thereby causing motor 95 to rotate shaft 100 in a direction necessary to move bed 41 outwardly away from the stream of books. As the bed moves horizontally outwardly so too will belt 25a and band saw 34, both trained about rollers which move horizontally with the bed. As long as the books keep pressing against sensor 70, the electrical connection between terminals 88, 90 will be maintained and bed 41 will continue to move outwardly. When the bed has moved sufficiently far that the side edges of the books no longer overcome the bias of springs 84, 86, terminal 88 will move away from terminal 90 and motor 95 will shut off.

Conversely when the size of books passing by sensor 70 decreases, springs 84, 86 bias the sensor inwardly into contact with the smaller books thereby causing central terminal 88 to make electrical connection with terminal 92. Motor 95 thereupon causes shaft 100 to rotate in a direction necessary to move bed 41 inwardly and the bed will continue to move until the book-facing surfaces of sensor 70 and belt 25a are coplanar at which time the micro-switch assembly opens.

The opposing belt assembly 25b (FIG. 1) and the band saw 36 are trained about rollers which are rotatably mounted to a fixed bed 42. The belt 25b and saw 36 are accordingly not horizontally adjustable either inwardly or outwardly and when the size of books advanced by belt 25b changes, movable bed 41 will continue to move inwardly or outwardly until the space between the two belt assemblies 25a, 25b equals the width of the stream of books.

FIG. 4 illustrates the means by which the position of the horizontally cutting band saw 43 is adjusted to books of various sizes within a given range. The adjusting means illustrated therein, indicated generally 107, is similar to that illustrated in FIG. 3. With reference to FIG. 4, sensor 108 contacts the top edges 109 of the books and is connected by means of spaced rods 110, 112 to a top bar 114. A housing 115 is mounted to the top bar 114 and a thumb screw 116 is rotatably mounted in an opening in the housing 115 and is threadably received in a bracket 117 to which a pair of spaced parallel electrically insulated terminals 118, 119 are mounted in circuit with an electric motor (not illustrated).

A central electrically insulated terminal 122 disposed between terminals 118, 119 is connected to a band saw housing 124 movable upwardly and downwardly in the direction of arrow 126 by means of a worm shaft 128 driven by the last-mentioned electric motor. Rollers 44a, b are journalled in bearings provided in the housing.

Rods 110, 112 are slideably mounted within openings in a bracket 130 fixed to housing 124 and a pair of compression springs 132, 134 mounted about the rods beneath the bracket bias sensor 108 into contact with the books.

As with sensor 70, the location of sensor 108 either upwardly or downwardly determines the location of the top trimming saw 43. When for example, central terminal 122 is contacted by upper terminal 118, the electric motor rotates shaft 128 to cause saw 43 and bracket 130 to move downwardly.

Adjustment of the amount to be trimmed off the book or the width of selvage is obtained by appropriate rotation of thumb screw 116. If more trim is required, the screw is turned to move upper terminal 118 closer to central terminal 122 and conversely if less trim is required, lower terminal 119 is moved closer to the central terminal by means of the thumb screw.

Where books passing through the trimming assembly are to be attached to hard covers, i.e. where the books are of the cased-in type, it is preferable to substitute for the adjusting means 107 illustrated in FIG. 4 an adjusting means at the delivery end of the hot melt binder 21. The adjusting means is shown diagrammatically in FIG. 1 and comprises a sensor 140 and micro-switch assembly 141 both similar to that described with reference to FIG. 3. The sensor 140, however, determines the thickness of each book as it passes thereby while the books are in an end to end position and before they become lapped as at 22.

Variations in the thickness of the book are detected by micro-switch 141 which is electrically connected to the motor which adjusts the height of top band saw 43. However, by means of a suitable memory means 142 such as an IBM 1800 Data Acquisition and Control System or an IBM System/7 Sensor Based System, these variations are not reflected in the position of the top band saw until the books are beneath the saw.

By means of the just described adjusting means, the thickness of each book will govern the width of selvage removed from the top of the pages by top band saw 43. The thicker the book, the more selvage will be removed by the saw and the shorter will be the height (spine to upper edge) of the book (shown as 143 in FIG. 2). Conversely, the thinner the book, the higher the saw will be and the greater the height 143 will be. Provided that the "cases" or covers in which the books are mounted are of uniform dimensions, the "square" or the distance between the two side edges of the finished book and the side edges of the case or cover, (indicated 144 in FIG. 18 of our parent application referred to above) will be uniform.

With further reference to FIG. 1, disposed immediately downstream of belt advance rollers 66, 67 is a pair of elongated guides 152, 154 respectively, each being flared outwardly at the upstream end and being spaced apart a distance equal to the width of the books downstream. Guides 152, 154 are mounted to beds 41, 42 respectively such that the space between them adjusts to the size of the books passing therebetween. The guides extend vertically upwardly from the beds sufficiently to contact a substantial portion of the side edges of the pages therebetween.

Guides 152, 154 serve to straighten any books which may be improperly aligned and not at right angles to the direction of travel of belt 24. The guides operate as follows: if a book is misaligned on the belt such that one side reaches guide 152 before the other side reaches guide 154, the former side will no longer by pushed by belt 25a whereas the latter side will continue to be pushed forward by belt 25b. The guides also ensure that books are packed tightly together before passing between saw 34, 36 since the tightly packed books will provide necessary back-up support for books being trimmed.

Up to this point, the spines 32 of the books have been resting on the lower moving conveyor belt 24 but when the books pass between guides 152, 154, the spines move onto table 26. The table facilitates the packing process since side belts 25a, b, and bottom belt 24 all co-operate to press the books tightly between guides 152, 154 while table 26 provides the necessary friction for the spine of the book which is being pushed onto the table by lower belt 24.

Band saws 34, 36 and 43 may have a tooth configuration illustrated in FIGS. 5–7 instead of the configuration illustrated in FIGS. 2A and 2B. The cutting edge 160 of the saw 161, illustrated in FIG. 5, is defined by a plurality of teeth each composed of a trailing edge 162 which is oriented generally normally to the direction of travel of the blade, indicated by double headed arrow 164, and a leading edge 166 which is oriented at an oblique angle to the direction of travel of the blade. While the blade may travel in either direction, it is preferred that it travel toward the right, i.e. in the direction in which the leading edge of each tooth makes first contact with books to be trimmed.

The outermost portion of each tooth is defined by a cutting edge 168 which extends parallel to the direction of travel of the blade between the leading and trailing edges 166, 162. The length of edge 168 (indicated 168a) may vary from zero (in which case, of course, the leading and trailing edges 166, 162 terminate at a point) to 10 cm. or even longer.

With reference to FIG. 6, the surface of the blade which contacts book selvage is composed of an outwardly facing surface 170 which lies in a plane parallel to the cutting run of the saw. Surface 170 commences at the base 172 of the blade and terminates at a beveled surface 174 oriented at an oblique angle to the cutting run of the saw. The angle of the bevel indicated 176 and being the angle between the plane of surface 170 extended and bevel surface 174 can vary widely but will generally be in the range of 15°–30°.

The face of the blade which contacts the trimmed pages is provided with a first portion 178 which commences at the base of the blade and lies in a plane parallel to the cutting run of the saw. The first portion terminates at a juncture 180 between that portion and a second or a so-called "counter-beveled" portion 182. The latter portion lies in a plane oriented at an oblique angle to the cutting run and terminates at the cutting edge 168 of the saw.

The angle between the planes of the first and second blade surface portions 178, 182, indicated 184 may vary widely. In practice, it will be fixed experimentally according to the angle which will give the most satisfactory cut in the particular material being trimmed. Usually the angle will be in the range of 2°–25° but may be as low as zero. The ratio of the length of the first portion 178, i.e. the distance between the base 172 and juncture 180 (marked 186) and the length of the second portion marked (188) may be in the range of 1:10 and 1:100 or even high depending on the ratio which results in the best cut in the material being trimmed.

With reference to FIG. 7, the saw 161 is shown in conjunction with a stationary guide, generally 190. Guide 190 is provided with a surface 194 which slidingly contacts surface 170 and an oppositely facing outer beveled surface 196 which opens outwardly in the direction of travel of the books to cause selvage removed by the blade to travel outwardly and away from the trimmed pages. Guide 190 supports the blade and ensures that the portion of the blade in contact with the pages does not twist and unevenly cut the pages.

It will be understood, of course, that modification can be made in the preferred embodiments of the invention described and illustrated herein without departing from the scope and purview of the appended claims.

What we claim as new and desire to protect by Letters Patent of the United States is:

1. A method of trimming selvage from a plurality of books including the following steps: providing a saw having a pair of oppositely facing surfaces which merge at a cutting edge, one said surface having first and second portions, said first portion extending from a base of said saw to said second portion and being disposed substantially in a plane parallel to the cutting run of said saw and said second portion extending from said first portion to said cutting edge, the other said surface being oriented at an oblique angle to said cutting run plane; causing said books to advance downstream to said saw; positioning said saw relative to said books such that the cutting run of said saw is both normal to the direction of advance of said books and is substantially parallel to the plane of the pages of said books and such that said one surface faces pages to be trimmed by said saw and the other said surface faces selvage to be trimmed by said saw; and trimming said books by means of said saw.

2. The method as claimed in claim 1 wherein the angle between the planes of said second portion and said cutting run is in the range of 0° and 25°, said second portion extending outwardly of said books when said angle is greater than 0.

3. A method of trimming selvage from a plurality of books including the following steps: providing a saw having a toothed cutting edge, each tooth defined by a pair of oppositely facing surfaces which merge at a cutting edge, one said surface having first and second portions, said first portion extending from a base of saw to said second portion and being disposed substantially in a plane parallel to the cutting run of said saw and said second portion extending from said first portion to said cutting edge, the other said surface being oriented at an oblique angle to said cutting run plane; causing said books to advance downstream to said saw; positioning said saw relative to said books such that the cutting run of said saw is both normal to the direction of advance of said books and is substantially parallel to the plane of the pages of said books and such that said one surface faces pages to be trimmed by said saw and the other said surface faces selvage to be trimmed by said saw; and trimming said books by means of said saw.

4. The method as claimed in claim 3 further including providing a pair of said saws; locating said saws such that their cutting runs are parallel to one another; placing said books such that a spine of each is disposed normal to the cutting runs of said saws; and causing said books to advance to and between said saws.

5. The method as claimed in claim 3 further including providing three said saws; locating said saws such that the cutting runs of two thereof are parallel to one another and such that the cutting run of the third saw is normal to that of the other two saws; placing said books such that a spine of each is disposed parallel to the cutting run of said third saw; and causing said books to advance to and through the space defined by said three saws, said third saw contacting edges of said books opposite their spines.

6. The method as claimed in claim 3 wherein the angle between the planes of said second portion and said cutting run is in the range of 0° and 25°, said second portion extending outwardly of said books when said angle is greater than 0.

7. A method as claimed in claim 3 further including measuring changes in the size of books to be trimmed by said saw; and adjusting the position of said saw relative to said books such that the width of selvage removed by said saw, measured on a line normal to the direction of book advance, remains the same despite variations in the size of books trimmed by said saw.

8. The method as claimed in claim 3 wherein said first and second portions meet at a juncture, the angle between the planes of said second portion and said cutting run is in the range of 2° and 25°, said second portion extending outwardly of said books, the ratio of the distances between said base and said juncture and between said juncture and said cutting edge is in the range of 1:10 and 1:100.

9. The method as claimed in claim 3 further providing a stationary guide in sliding contact with the other said tooth surface and having a pair of side surfaces which merge in the downstream direction.

* * * * *